United States Patent
Nakamura et al.

(10) Patent No.: US 11,390,749 B2
(45) Date of Patent: Jul. 19, 2022

(54) SURFACE MODIFIER FOR RUBBER COMPOSITION, AND RUBBER COMPOSITION CONTAINING SAME

(71) Applicant: NIPPON SEIRO CO., LTD., Tokyo (JP)

(72) Inventors: Yoji Nakamura, Tokyo (JP); Tetsuaki Ando, Tokyo (JP); Arata Taguchi, Tokyo (JP)

(73) Assignee: NIPPON SEIRO CO., LTD., Tokyo (JP)

( * ) Notice: Subject to any disclaimer, the term of this patent is extended or adjusted under 35 U.S.C. 154(b) by 77 days.

(21) Appl. No.: 16/646,247

(22) PCT Filed: Aug. 28, 2018

(86) PCT No.: PCT/JP2018/031731
§ 371 (c)(1),
(2) Date: Mar. 11, 2020

(87) PCT Pub. No.: WO2019/077885
PCT Pub. Date: Apr. 25, 2019

(65) Prior Publication Data
US 2020/0207987 A1    Jul. 2, 2020

(30) Foreign Application Priority Data

Oct. 17, 2017  (JP) ............................. JP2017-200827
Dec. 21, 2017  (JP) ............................. JP2017-244751

(51) Int. Cl.
| | | |
|---|---|---|
| C08L 91/00 | (2006.01) | |
| C08L 91/06 | (2006.01) | |
| B60C 1/00 | (2006.01) | |
| C08L 7/02 | (2006.01) | |
| C08L 23/22 | (2006.01) | |
| C08L 55/02 | (2006.01) | |
| C08K 5/05 | (2006.01) | |

(52) U.S. Cl.
CPC ............ *C08L 91/06* (2013.01); *B60C 1/0016* (2013.01); *B60C 1/0025* (2013.01); *C08L 7/02* (2013.01); *C08L 23/22* (2013.01); *C08L 55/02* (2013.01); *C08K 5/05* (2013.01)

(58) Field of Classification Search
CPC .... C08L 91/06; C08L 7/00; C08L 9/00; C08L 21/00; C08L 23/22; C08L 55/02; C08L 7/02; C08L 91/08; C08L 23/00; C08L 2205/02; C08K 3/04; C08K 5/05; C08F 222/06; C08F 289/00; C08F 8/46; B60C 1/00; B60C 1/0016; B60C 1/0025; C09F 1/04; C09G 1/08; C11C 1/025; C11C 3/003; C11C 3/006

See application file for complete search history.

(56) References Cited

FOREIGN PATENT DOCUMENTS

| | | |
|---|---|---|
| CN | 103374152 | 10/2013 |
| JP | 2002-60547 | 2/2002 |
| JP | 2011-89098 | 5/2011 |
| JP | 2013-227385 | 11/2013 |
| JP | 5475579 | 2/2014 |

OTHER PUBLICATIONS

International Search Report (ISR) dated Nov. 20, 2018 in International (PCT) Application No. PCT/JP2018/031731.
Notice of Reasons for Refusal dated Jan. 5, 2021 in corresponding Japanese Patent Application No. 2019-549138 with English-language translation.
Matsumoto et al., "Systematic Analysis of Natural Raw Waxes (Carnauba Wax, Candelilla Wax and Bees Wax) and Pattern-Analysis of Carbon Chain Length of Their Components", Journal of the Japan Society of Chemistry (Chemistry and Industrial Chemishy), May 10, 1972, vol. 1972, No. 5, pp. 951-957, with Partial English-language translation.
Office Action dated Sep. 6, 2021 in Chinese Patent Application No. 201880066794.8, with English-language translation.
Extended European Search Report dated Jul. 7, 2021 in European Patent Application No. 18867853.6.
Office Action dated Mar. 9, 2022 in corresponding Chinese Patent Application No. 201880066794.8, with English translation.

*Primary Examiner* — Sharon Pregler
(74) *Attorney, Agent, or Firm* — Wenderoth, Lind & Ponack, L.L.P.

(57) ABSTRACT

The present invention provides a surface modifier for a rubber composition that can enhance appearance without decreasing ozone resistance of the rubber composition. The surface modifier for a rubber composition of the present invention includes a hydrocarbon-based anti-aging wax for rubber (B) and an appearance-improving agent (C), in which: the content of a linear monovalent primary alcohol is more than 1.5 parts by weight and less than 35 parts by weight per 100 parts by weight of the surface modifier for a rubber composition; per 100 parts by weight of the primary alcohol, the content of a component having 30 to 38 carbon atoms is more than 35 parts by weight; the content of a component having 12 to 26 carbon atoms is less than 25 parts by weight; and the content of a component having 42 to 68 carbon atoms is less than 25 parts by weight.

4 Claims, No Drawings

SURFACE MODIFIER FOR RUBBER COMPOSITION, AND RUBBER COMPOSITION CONTAINING SAME

TECHNICAL FIELD

The present invention relates to a surface modifier for a rubber composition, and a rubber composition comprising the surface modifier for a rubber composition.

BACKGROUND ART

In rubber compositions in which natural rubber and/or dienic synthetic rubber is used, hydrocarbon-based anti-aging wax for rubber is blended for preventing degradation due to ozone. Blended wax precipitates (also referred to as "bloom" or "blooming") on the surface of rubber to form a thin film (also referred as "blooming film"). This thin film blocks the contact of rubber and ozone, thus preventing degradation of rubber. On the other hand, wax that has excessively bloomed significantly deteriorates the appearance of surface of the rubber composition. This deterioration of appearance includes white discoloration caused by wax itself and brown discoloration caused by deterioration of anti-aging agents which bloom together with wax. Therefore, it is desirable to suppress excessive wax blooming.

It is conventionally proposed that excessive wax blooming on the surface of rubber and deterioration of appearance of rubber compositions are prevented by blending hydrocarbon-based high-melting point waxes such as microcrystalline wax, Fischer-Tropsch wax, and low molecular weight polyethylenes, or natural waxes derived from animals and plants (also referred to as "animal and plant wax") (for example, see, Patent Literatures 1 to 3).

However, blending hydrocarbon-based high-melting point wax may decrease ozone resistance of the rubber composition, or result in insufficient effect of suppressing wax blooming. Therefore, it could not be said that the effect of improving appearance of the rubber composition was satisfactory. In addition, although a certain level of blooming suppressing effect may be obtained by blending animal and plant wax, wax crystals on the rubber surface are made finer. Thus, there has been a concern that such blending unexpectedly deteriorates appearance of the rubber composition in some cases.

CITATION LIST

Patent Literature

Patent Literature 1: JP 2011-89098 A
Patent Literature 2: JP 5475579 B
Patent Literature 3: JP 5457492 B
Patent Literature 4: JP 2002-60547 A

SUMMARY OF INVENTION

Technical Problem

In view of the above-mentioned situation, the applicant of the present application has proposed reducing the amount of wax blooming without decreasing ozone resistance of the rubber composition and improving appearance of the rubber composition, by using a higher alcohol having a differential scanning calorimetry (DSC) peak temperature of 60° C. to 105° C. in combination with anti-aging wax for rubber (Patent Literature 4).

However, later studies reveal that, even with a higher alcohol having a DSC peak temperature of 60° C. to 105° C., there is a case where ozone resistance of the rubber composition is considerably decreased, or a case where the appearance is not improved, and therefore there has been still room for further improvement. In addition, higher alcohols currently commercially available are expensive, and therefore there has been also room for improvement in view of economical efficiency.

The present invention is conceived in view of the above circumstances, and an object of the present invention is to provide a surface modifier for a rubber composition that can enhance appearance without decreasing ozone resistance of the rubber composition.

Solution to Problem

To achieve the above-described object, the inventors of the present invention conducted diligent research focusing on carbon number distribution of higher alcohols. As a result, the inventors of the present invention found that, in higher alcohols, alcohol components with relatively small carbon numbers decrease ozone resistance and alcohol components with relatively large carbon numbers deteriorate appearance, and identified the carbon number of an alcohol component that can improve appearance while minimizing effects on ozone resistance. The inventors of the present invention also found that, higher alcohols obtained by hydrolyzing rice bran wax which is one type of plant wax, have desired characteristics and even particularly excel in view of economical efficiency.

The inventors of the present invention further conducted research on the basis of these novel findings, and thereby completed the present invention.

The present invention includes the following aspects.

(1) A surface modifier for a rubber composition including a hydrocarbon-based anti-aging wax for rubber (B), and an appearance-improving agent (C), in which the content of a linear monovalent primary alcohol is more than 1.5 parts by weight and less than 35 parts by weight per 100 parts by weight of the surface modifier for a rubber composition, and per 100 parts by weight of the primary alcohol, the content of a component having 30 to 38 carbon atoms is more than 35 parts by weight, the content of a component having 12 to 26 carbon atoms is less than 25 parts by weight, and the content of a component having 42 to 68 carbon atoms is less than 25 parts by weight.

(2) The surface modifier for a rubber composition according to item (1), in which the content of the primary alcohol is more than 2 parts by weight and less than 25 parts by weight per 100 parts by weight of the surface modifier for a rubber composition.

(3) The surface modifier for a rubber composition according to item (1) or (2), in which, per 100 parts by weight of the primary alcohol, the content of the component having 30 to 38 carbon atoms is more than 70 parts by weight, the content of the component having 12 to 26 carbon atoms is less than 15 parts by weight, and the content of the component having 42 to 68 carbon atoms is less than 5 parts by weight.

(4) The surface modifier for a rubber composition according to any one of items (1) to (3), further including a hydrolyzate of plant wax.

(5) The surface modifier for a rubber composition according to item (4), in which the plant wax is rice bran wax.
(6) A rubber composition including a rubber component (A), and the surface modifier for a rubber composition according to any one of items (1) to (5), in which the content of the component having 12 to 26 carbon atoms of the primary alcohol of the surface modifier for a rubber composition is 0.1 parts by weight or less per 100 parts by weight of the rubber component (A).
(7) The rubber composition according to item (6), in which, per 100 parts by weight of the rubber component (A),
the content of the anti-aging wax for rubber (B) of the surface modifier for a rubber composition is 0.1 to 10 parts by weight, and
the content of the primary alcohol of the surface modifier for a rubber composition is 0.03 to 1 parts by weight.
(8) The rubber composition according to item (6) or (7), in which the content of the appearance-improving agent (C) of the surface modifier for a rubber composition is 0.03 to 5 parts by weight per 100 parts by weight of the rubber component (A).
(9) A pneumatic tire produced by using the rubber composition according to any one of items (6) to (8).

Advantageous Effects of Invention

According to the present invention, provided is a surface modifier for a rubber composition that can enhance appearance without decreasing ozone resistance of the rubber composition.

Furthermore, according to the present invention, provided is a rubber composition that has desired ozone resistance and excels in appearance, the rubber composition including the above-described surface modifier.

DESCRIPTION OF EMBODIMENTS

Hereinafter, embodiments of the present invention will be described.
<Surface Modifier for Rubber Composition>
The surface modifier for a rubber composition according to an embodiment of the present invention includes a hydrocarbon-based anti-aging wax for rubber (B) (hereinafter, simply also referred to as "wax") and an appearance-improving agent (C), in which: the content of a linear monovalent primary alcohol is more than 1.5 parts by weight and less than 35 parts by weight per 100 parts by weight of the surface modifier for a rubber composition; per 100 parts by weight of the primary alcohol, the content of a component having 30 to 38 carbon atoms is more than 35 parts by weight; the content of a component having 12 to 26 carbon atoms is less than 25 parts by weight; and the content of a component having 42 to 68 carbon atoms is less than 25 parts by weight.

In the description of the present invention, the "linear monovalent primary alcohol" (hereinafter, simply also referred to as "primary alcohol") refers to a compound represented by the following structural formula.

[Chemical Formula 1]

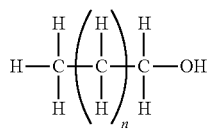

(where n is an integer of 1 or more)

In the surface modifier for a rubber composition according to the present embodiment (hereinafter, simply also referred to as "surface modifier"), the content ratio of the primary alcohol is preferably more than 1.5 parts by weight and less than 35 parts by weight, and more preferably more than 2 parts by weight and less than 25 parts by weight per 100 parts by weight of the surface modifier. When the content ratio of the primary alcohol is less than 1.5 parts by weight, the effect of the primary alcohol contained in the surface modifier on the rubber composition is less likely to be obtained, and there is a possibility that the effects of other components relatively increase and this causes expression of undesired effects.

In the surface modifier according to the present embodiment, the content of a component having 30 to 38 carbon atoms is preferably more than 35 parts by weight, more preferably more than 40 parts by weight, even preferably more than 60 parts by weight, and even more preferably more than 70 parts by weight per 100 parts by weight of the above-described primary alcohol. When the content of the component having 30 to 38 carbon atoms is 35 parts by weight or less, there is a possibility that a sufficient appearance-improving effect on the rubber composition cannot be obtained.

In the surface modifier according to the present embodiment, the content of a component having 12 to 26 carbon atoms is preferably less than 25 parts by weight, more preferably less than 20 parts by weight, and even preferably less than 15 parts by weight. When the content of the component having 12 to 26 carbon atoms is 25 parts by weight or more, there is a possibility that alcohol components bloomed with wax disturb a blooming film and thereby decrease ozone resistance of the rubber composition.

In the surface modifier according to the present embodiment, the content of a component having 42 to 68 carbon atoms is preferably less than 25 parts by weight, more preferably less than 15 parts by weight, and even preferably less than 5 parts by weight. When the content of the component having 42 to 68 carbon atoms is 25 parts by weight or more, there is a possibility that white discoloration on the rubber surface is caused and appearance of the rubber composition is deteriorated.

As the physical properties of the primary alcohol, which is contained in the surface modifier according to the present embodiment and which has the above-described carbon number distribution and composition, a primary alcohol having a melting peak temperature in differential scanning calorimetry of 75° C. or more and less than 90° C. is preferred, and a primary alcohol having a melting peak temperature of 80° C. or more and less than 88° C. is more preferred. Furthermore, as the melting start temperature of the above-described primary alcohol, a primary alcohol having a melting start temperature of 65° C. or more and less than 82° C. is preferred, and a primary alcohol having a melting start temperature of 70° C. or more and less than 82° C. is more preferred. Furthermore, as the melting end temperature, a primary alcohol having a melting end temperature of 82° C. or more and less than 96° C. is preferred, and a primary alcohol having a melting end temperature of 84° C. or more and less than 94° C. is more preferred.

Furthermore, as the physical properties of the above-described surface modifier, a surface modifier with a hydroxyl value of 2 or more is preferred.

The origin of the appearance-improving agent contained in the surface modifier according to the present embodiment is not particularly limited. Examples thereof include appearance-improving agents obtained by splitting synthesized higher alcohols synthesized by any method into components by, for example, molecular distillation; appearance-improving agents obtained by hydrolyzing and/or performing trans-esterification on a part or all of animal and plant wax or montan wax by any method; and appearance-improving agents obtained by reducing a part or all of wax esters and/or higher fatty acids by any method. The appearance-improving agents obtained by these methods normally include, as components other than the linear monovalent primary alcohol, alkanes, alkenes, alkynes, carboxylic acids, ketones, aldehydes, primary alcohols which are not linear and/or contain an unsaturated bond, secondary alcohols, tertiary alcohols, polyhydric alcohols which are di- or higher valent, resins, and wax esters, for example, but these components need not be actively removed. In particular, higher fatty acids obtained by hydrolyzing animal and plant wax function as a vulcanizing aid in the rubber composition, and therefore there is no need for removing the higher fatty acids. Of course, any component may be removed by using any method. As a specific example in the case of hydrolyzates of animal and plant wax, a method of forming fatty acids contained into esters with lower alcohols, then removing higher fatty acid esters by utilizing the difference in solubility to a low polarity solvent between higher alcohols and esters, and thus condensing higher alcohols is known (JP H06-212187 A).

Meanwhile, when the appearance-improving agent contained in the surface modifier according to the present embodiment contains linear alkanes (also referred to as "normal alkanes") with a high melting point, ozone resistance of the rubber composition may be decreased. Therefore, the content of a linear alkane having 50 to 68 carbon atoms is preferably considered to be less than 2 parts by weight per 100 parts by weight of the above-described primary alcohol.

Furthermore, as a more specific embodiment of surface modifier of the present invention, a surface modifier containing hydrolyzates of animal and plant wax, and/or montan wax is preferably considered. Examples of the animal wax include beeswax, lanolin, and spermaceti, but are not limited thereto. Examples of the plant wax include carnauba wax, candelilla wax, Japan wax, sunflower wax, and rice bran wax, but are not limited thereto. Among these, a surface modifier containing higher alcohols contained in hydrolyzates of rice bran wax can more efficiently provide a primary alcohol having the above-described carbon number distribution and composition, and thus is particularly preferred in view of economical efficiency. Note that, as a method of hydrolyzing animal and plant wax, any generally known method can be employed.

The composition of the hydrocarbon-based anti-aging wax for rubber (B) contained in the surface modifier according to the present embodiment is not particularly limited. The commonly-used anti-aging wax for rubber (B) is paraffin wax, Fischer-Tropsch wax, microcrystalline wax, or a mixture thereof. The type and combination of wax is selected according to the temperature range in which the rubber composition is used. Polyethylene, and the like may be blended in these waxes for the purpose of preventing blooming and/or blocking.

<Rubber Composition>

The rubber composition according to an embodiment of the present invention contains a rubber component (A) and the above-described surface modifier as a necessary component.

The rubber component (A) used for the rubber composition according to the present embodiment is not particularly limited. Examples thereof include dienic synthetic rubbers, isoprene-based rubbers, and a mixture thereof. Examples of the dienic synthetic rubber include styrene-butadiene rubber (SBR), butadiene rubber (BR), acrylonitrile-butadiene rubber (NBR), and chloroprene rubber (CR). Examples of the isoprene-based rubber include isoprene rubber (IR), natural rubber (NR), and modified natural rubber. One type of rubber component may be used alone, or two or more types of rubber components may be used in combination.

In the rubber composition according to the present embodiment, the content of the component having 12 to 26 carbon atoms in the primary alcohol of the above-described surface modifier is preferably 0.1 parts by weight or less per 100 parts by weight of the rubber component (A). This can efficiently provide an appearance-improving effect without decreasing ozone resistance of the rubber composition.

That is, in the rubber composition according to the present embodiment, in a case where the surface modifier contains other components other than the above-described primary alcohol, it is necessary to measure the concentration (content ratio) of the linear monovalent primary alcohol in advance by using any method such as gas chromatograph. Otherwise, when the surface modifier is blended in the rubber composition, there is a possibility that an appearance-improving effect cannot be sufficiently obtained because the blended amount of the primary alcohol relative to the rubber component (A) is too small, a possibility that ozone resistance decreases because the blended amount of the primary alcohol relative to the rubber component (A) is too large, or a possibility that the effects of other components other than the primary alcohol cannot be ignored.

In the rubber composition according to the present embodiment, the content of the anti-aging wax for rubber (B) of the above-described surface modifier is preferably 0.1 to 10 parts by weight, and more preferably 0.5 to 5 parts by weight per 100 parts by weight of the rubber component (A).

In the rubber composition according to the present embodiment, the content of the primary alcohol of the above-described surface modifier is preferably 0.03 to 1 parts by weight, and more preferably 0.1 to 1 parts by weight per 100 parts by weight of the rubber component (A). When the content of the primary alcohol is within the above-described range, the appearance-improving effect in the rubber composition can be more efficiently obtained.

In the rubber composition according to the present embodiment, the blended amount of the appearance-improving agent (C) of the above-described surface modifier is preferably 0.03 to 5 parts by weight, and more preferably 0.1 to 1.5 parts by weight per 100 parts by weight of the rubber component (A). When the blended amount of the appearance-improving agent (C) is less than 0.03 parts by weight, the appearance-improving effect in the rubber composition is insufficient in some cases. When the blended amount of the appearance-improving agent (C) is more than 5 parts by weight, the blended amount of the appearance-improving agent (C) as an additive for the rubber component (A) is too large. This decreases ozone resistance and also causes disadvantages in view of cost in some cases.

In addition to the above-described necessary components, any auxiliary modifier (D) can be blended in the rubber composition according to the present embodiment for the purpose of compensating or enhancing the effect of the surface modifier. Examples of such an auxiliary modifier (D), but are not particularly limited to, include animal and plant waxes, and more specific examples include rice bran wax. In a case where the auxiliary modifier (D) is used, the blended amount of the auxiliary modifier (D) per 100 parts by weight of the rubber component (A) can be appropriately adjusted according to, for example, the purpose of use of the rubber composition, and the temperature range in which the rubber composition is used. For example, adjusting the total of blended amounts of the appearance-improving agent (C) and auxiliary modifier (D) so as to be 0.03 to 5 parts by weight per 100 parts by weight of the rubber component (A) can suppress decrease in ozone resistance of the rubber composition and more efficiently provide the appearance-improving effect.

Furthermore, in addition to the above-described necessary components, additives such as fillers, vulcanizing agents, vulcanizing accelerators, vulcanizing aids, anti-aging agents, processing aids, and softening agents can be appropriately blended in the rubber composition according to the present embodiment within a range that does not impair the object of the present invention.

Examples of the filler used in the present embodiment include calcium carbonate, barium sulfate, talc, clay, titanium oxide, carbon black, white carbon, and silica.

Examples of the vulcanizing agent and vulcanizing accelerator used in the present embodiment include sulfur, organic sulfur-containing compounds such as tetramethylthiuram disulfide (TMTD), tetraethylthiuram disulfide (TETD), and dipentamethylenethiuram tetrasulfide (DPTT), and organic peroxides such as dicumylperoxide.

Examples of the anti-aging agent used in the present embodiment include p-phenylenediamine-based anti-aging agents such as N-isopropyl-N'-phenyl-p-phenylenediamine, N-octyl-N'-phenyl-p-phenylenediamine, N,N'-diallyl-p-phenylenediamine, N-(1,3-dimethylbutyl)-N'-phenyl-p-phenylenediamine, and N,N'-bis(1,4-dimethylpentyl)-p-phenylenediamine; and reaction products of ketone and amine such as 6-ethoxy-2,2,4-trimethyl-1,2-dihydroquinoline.

The vulcanizing method and vulcanizing condition of the rubber composition according to the present embodiment may be determined according to methods and conditions that are commonly performed. For example, vulcanization may be performed under a condition of 140° C. to 190° C. and 10 to 90 minutes by a method such as press vulcanization, steam vulcanization, and hot water vulcanization.

The pneumatic tire according to an embodiment of the present invention is produced using the above-described rubber composition by a common method. That is, the above-described rubber composition is extruded into a shape of, for example, a sidewall and tread of a tire in the stage of being unvulcanized. The extruded materials are molded on a tire molding machine by a common method. Then, the molded products are bonded to other tire members, and thereby an unvulcanized tire can be formed. This unvulcanized tire is heated and pressurized in a vulcanizing machine, and thereby a tire can be produced.

EXAMPLES

Hereinafter, the present invention will be further described in detail with reference to Examples, but the present invention is not limited to these Examples.

Mixed rubber (NR/BR) obtained by blending natural rubber and butadiene rubber shown in Table 1 at a ratio of 1:1 in terms of parts by weight, or styrene-butadiene rubber (SBR), as the rubber component (A); various types of additives; and materials having the compositions shown in Tables 2 to 6, as the surface modifier; were blended to prepare rubber compositions.

The respective materials of the surface modifiers shown in Tables 2 to 6 are as follows.

[Anti-Aging Wax for Rubber (B)]
  OZOACE-0355 (hydrocarbon-based anti-aging agent for rubber), available from Nippon Seiro Co., Ltd.
  OZOACE-0015A (hydrocarbon-based anti-aging agent for rubber), available from Nippon Seiro Co., Ltd.

[Appearance-Improving Agent (C)]
  Hi-Mic-1080: microcrystalline wax, available from Nippon Seiro Co., Ltd.
  SS-II: rice bran wax (monoester of higher alcohol and higher fatty acid), available from Boso Oil and Fat Co., Ltd. Hydrolysis treatment was performed in the laboratory.
  ECOSOLE-0001: sunflower wax (monoester of higher alcohol and higher fatty acid), available from Nippon Seiro Co., Ltd. Hydrolysis treatment was performed in the laboratory.
  Unilin 700, Unilin 425: synthesized higher alcohol, available from Baker Petrolite Corporation in the U.S. Molecular distillation was performed in the laboratory, and alkanes were then removed by column treatment to obtain higher alcohol components.
  Acculinol 700, Acculinol 550, Acculinol 425, Acculinol 350: synthesized higher alcohol, available from The International Group, Inc.

[Auxiliary Modifier (D)]
  SS-II: rice bran wax (monoester of higher alcohol and higher fatty acid), available from Boso Oil and Fat Co., Ltd.

The content of the linear monovalent primary alcohol per 100 parts by weight of the surface modifier in each of Examples and Comparative Examples was measured by using 6890N GC or 7890B GC, available from Agilent Technologies, Inc. The components of higher alcohol contained in each surface modifier sample (contents of respective components with different carbon numbers) were measured by using 6890N GC or 7890B GC, available from Agilent Technologies, Inc., and calculated as the primary alcohol being 100 parts by weight. The added amount of primary alcohol of the surface modifier sample per 100 parts by weight of the rubber component (A) was calculated from the added amount of the surface modifier and the weight ratio of the primary alcohol contained in the surface modifier.

Characteristic evaluation was performed using the obtained rubber compositions of respective Conventional Examples, Examples, and Comparative Examples by the following tests. The results are shown in Tables 2 to 9.

In the rubber compositions of Conventional Examples 1 to 3, Examples 1 to 8, and Comparative Examples 1 to 11 shown in Tables 2 to 5, 7, and 8, mixed rubber (NR/BR) was used as the rubber component (A).

In the rubber compositions of Conventional Example 4, Examples 9 to 10, and Comparative Examples 12 to 15 shown in Tables 6 and 9, styrene-butadiene rubber (SBR) was used as the rubber component (A).

<Rubber Appearance Evaluation: White Discoloration Test (Indoor)>

A vulcanized rubber sheet (145×145×2 mm) obtained by subjecting a rubber composition to vulcanization treatment was hung in a thermostat drying bath set at 40° C. or 30° C., and then taken out after leaving 45 days. The surface of the rubber sheet was measured by a colorimeter (CM2002, available from Konica Minolta Japan, Inc.). L*(SCE) was used for evaluation of white discoloration. As the value of L*(SCE) is small, the surface of rubber is black, and appearance is good. According to the compositions of rubber compositions of respective Examples and Comparative Examples, evaluation was performed using the result of Conventional Example 1, 3, or 4 as a criterion and using the following indicator.

(Evaluation Indicator)

S: The difference of the value (index value) compared to Conventional Example 1, 3 or 4 is: (index value)≤−2.0.

A+: The difference of the value (index value) compared to Conventional Example 1, 3 or 4 is: −2.0<(index value)≤−1.5.

A: The difference of the value (index value) compared to Conventional Example 1, 3 or 4 is: −1.5<(index value)≤−0.75.

B: The difference of the value (index value) compared to Conventional Example 1, 3 or 4 is: −0.75<(index value)<+1.0.

C: The difference of the value (index value) compared to Conventional Example 1, 3 or 4 is: +1.0≤(index value).

<Rubber Appearance Evaluation: Outdoor Exposure Test>

A vulcanized rubber sheet produced by a method similar to the above-described method was stored in a sunny outdoor place, and the surface of the rubber sheet was measured by a colorimeter 3 months later. An indicator similar to the above-described indicator was used for evaluation of white discoloration. The sum of a*(SCE) and b*(SCE) was used for evaluation of brown discoloration. As the value is large, the surface of rubber is brown, and appearance is poor. Therefore, a smaller value is desirable. According to the compositions of rubber compositions of respective Examples and Comparative Examples, evaluation was performed using the result of Conventional Example 1, 3, or 4 as a criterion and using the following indicator.

(Evaluation Indicator)

S: The difference of the value (index value) compared to Conventional Example 1, 3 or 4 is: (index value)≤−3.0.

A': The difference of the value (index value) compared to Conventional Example 1, 3 or 4 is: −3.0<(index value)≤−2.0.

A: The difference of the value (index value) compared to Conventional Example 1, 3 or 4 is: −2.0<(index value)≤−1.0.

B: The difference of the value (index value) compared to Conventional Example 1, 3 or 4 is: −1.0<(index value)<+1.0.

C: The difference of the value (index value) compared to Conventional Example 1, 3 or 4 is: +1.0 (index value).

Evaluation of brown discoloration was also performed by visual observation. The evaluation indicator is as follows.

(Evaluation Indicator)

Good: No brown discoloration is observed.

Fair: Brownish color is observed.

Bad: Brown discoloration is clearly observed.

<Ozone Resistance Test: JIS K 6301>

A vulcanized rubber sheet was punched out into a No. 1 dumbbell shape, then a rubber piece was exposed for 22 hours in a state of being stretched 50% (NR/BR) or 60% (SBR) in an ozone weather meter OSM-1V available from Suga Test Instruments Co., Ltd., in an ozone atmosphere (ozone concentration: 100 pphm, temperature: 40° C.), and the state of cracks was checked. As the size of cracks on the rubber sheet surface is small and the number of cracks is small, ozone resistance is good. Evaluation was performed using the result of a control sample as a criterion and using the following indicator. In the evaluation according to this method, the difference in performance tends to markedly appear compared to the method using critical strain as an evaluation criterion.

(Evaluation Indicator)

Good: The size of cracks is the same or smaller compared to a control sample and the number of cracks is less than 2 times the control sample.

Bad: The size of cracks is large compared to a control sample and/or the number of cracks is 2 times or more the control sample.

TABLE 1

| Component | Amount (pts. wt.) |
|---|---|
| NR (RSS#1) | 50 |
| BR (BR01, JSR Corporation) | 50 |
| Zinc oxide (#1 Zinc Oxide, Hakusui Tech Co., Ltd.) | 3 |
| Stearic acid (300, New Japan Chemical Co., Ltd.) | 2 |
| Aromatic oil (AH-16, Idemitsu Kosan Co., Ltd.) | 7 |
| FEF carbon (SEAST SO, Tokai Carbon Co., Ltd.) | 50 |
| Vulcanizing accelerator (ACCEL CZ, Kawaguchi Chemical Industry Co., Ltd.) | 0.8 |
| Sulfur (experimental reagent, Kishida Chemical Co., Ltd.) | 1.75 |
| Anti-aging agent (ANTAGE 6C, Kawaguchi Chemical Industry Co., Ltd.) | 1.5 |
| SBR (1712, JSR Corporation) | 137.5 |
| Zinc oxide (#1 Zinc Oxide, Hakusui Tech Co., Ltd.) | 3 |
| Stearic acid (300, New Japan Chemical Co., Ltd.) | 2 |
| Aromatic oil (AH-16, Idemitsu Kosan Co., Ltd.) | 2.5 |
| N339 carbon (SEAST KH, Tokai Carbon Co., Ltd.) | 80 |
| Vulcanizing accelerator (ACCEL CZ, Kawaguchi Chemical Industry Co., Ltd.) | 1.4 |
| Sulfur (experimental reagent, Kishida Chemical Co., Ltd.) | 2 |
| Anti-aging agent (ANTAGE 6C, Kawaguchi Chemical Industry Co., Ltd.) | 1 |

TABLE 2

| | | | Conv. Ex. 1 | Conv. Ex. 2 | Example 1 | Example 2 | Example 3 | Example 4 | Example 5 |
|---|---|---|---|---|---|---|---|---|---|
| Surface modifier | Anti-aging wax for rubber (B) | Sample name | OZOACE-0355 | OZOACE-0355 | | | OZOACE-0355 | | |
| | | Amount [phr] | 2.0 | 2.0 | 2.0 | 2.0 | 2.0 | 2.0 | 2.0 |
| | Appearance-improving agent (C) | Sample name | — | Hi-Mic-1080 | | SS-II Hydrolyzate | | Unilin425 Distillate-2 | |
| | | Amount [phr] | 0 | 0.1 | 0.21 | 1.03 | 0.1 | 0.1 | 0.5 |
| | Auxiliary modifier (D) | Amount [phr] | 0 | 0 | 0 | 0 | 0 | 0 | 0 |
| | Content of primary alcohol per 100 pts. wt. of surface modifier [pts. wt.] | | — | 0 | 4.5 | 16.5 | 2.3 | 4.8 | 20.0 |

TABLE 2-continued

|  |  |  | Conv. Ex. 1 | Conv. Ex. 2 | Example 1 | Example 2 | Example 3 | Example 4 | Example 5 |
|---|---|---|---|---|---|---|---|---|---|
|  | Contents of components with different carbon numbers per 100 pts. wt. of primary alcohol [pts. wt.] | 30-38 C | — | 0 |  | 72.8 |  | 83.6 |  |
|  |  | 12-26 C | — | 0 |  | 12.4 |  | 0.2 |  |
|  |  | 42-68 C | — | 0 |  | 0.0 |  | 1.0 |  |
|  |  | Melting peak temperature [° C.] | — | — |  | 81.2 |  | 84.7 |  |
|  | Amount of primary alcohol per 100 pts. wt. of rubber component (A) [pts. wt.] |  | — | 0 | 0.1 | 0.5 | 0.048 | 0.1 | 0.5 |
|  | Amounts of components with different carbon numbers of primary alcohol per 100 pts. wt. of rubber component (A) [pts. wt.] | 30-38 C | 0 | 0 | 0.0728 | 0.364 | 0.08736 | 0.0836 | 0.418 |
|  |  | 12-26 C | 0 | 0 | 0.0124 | 0.062 | 0.01488 | 0.0002 | 0.001 |
|  |  | 42-68 C | 0 | 0 | 0 | 0 | 0 | 0.00102 | 0.0051 |
|  | Content of 50-68 C linear alkane per 100 pts. wt. of primary alcohol [pts. wt.] |  | — | — | 0 | 0 | 0 | 0 | 0 |
| Rubber composition | Appearance evaluation | White discoloration at 40° C., L*(SCE) | reference | B | A | A+ | B | A | S |
|  |  | White discoloration at 30° C., L*(SCE) | reference | C | A | A | A | A | A |
|  | Ozone resistance evaluation | Conforming to JIS K 6301 | reference | good | good | good | good | good | good |

TABLE 3

|  |  |  | Example 6 | Example 7 | Compar. Ex. 1 | Compar. Ex. 2 | Compar. Ex. 3 | Compar. Ex. 4 | Compar. Ex. 5 |
|---|---|---|---|---|---|---|---|---|---|
| Surface modifier | Anti-aging wax for rubber (B) | Sample name | OZOACE-0355 | | | | OZOACE-0355 | | |
|  |  | Amount [phr] | 2.0 | 2.0 | 2.0 | 2.0 | 2.0 | 2.0 | 2.0 |
|  | Appearance-improving agent (C) | Sample name | Unilin425 | Distillate-3 | SS-II Hydrolyzate | ECOSOLE-0001 Hydrolyzate | Unilin700 | Distillate | Unilin425 Distillate-3 |
|  |  | Amount [phr] | 0.1 | 0.25 | 0.21 | 1.03 | 0.1 | 0.5 | 0.5 |
|  | Auxiliary modifier (D) | Amount [phr] | 0 | 0.25 | 0 | 0 | 0 | 0 | 0 |
|  | Content of primary alcohol per 100 pts. wt. of surface modifier [pts. wt.] |  | 4.8 | 5.4 | 4.5 | 16.5 | 4.8 | 20.0 | 20.0 |
|  | Contents of components with different carbon numbers per 100 pts. wt. of primary alcohol [pts. wt.] | 30-38 C | 43.3 | 72.8 | 17.3 |  | 51.4 |  | 43.3 |
|  |  | 12-26 C | 24.0 | 12.4 | 65.6 |  | 0.8 |  | 24.0 |
|  |  | 42-68 C | 0.0 | 0.0 | 0.0 |  | 30.4 |  | 0.0 |
|  |  | Melting peak temperature [° C.] | 78.1 | 81.2 | — |  | 90.9 |  | 78.1 |
|  | Amount of primary alcohol per 100 pts. wt. of rubber component (A) [pts. wt.] |  | 0.1 | 0.12 | 0.1 | 0.5 | 0.1 | 0.5 | 0.5 |
|  | Amounts of components with different carbon numbers of primary alcohol per 100 pts. wt. of rubber component (A) [pts. wt.] | 30-38 C | 0.0433 | 0.08736 | 0.0173 | 0.0865 | 0.0514 | 0.257 | 0.2165 |
|  |  | 12-26 C | 0.024 | 0.01488 | 0.0656 | 0.328 | 0.0008 | 0.004 | 0.12 |
|  |  | 42-68 C | 0 | 0 | 0 | 0 | 0.03036 | 0.1518 | 0 |
|  | Content of 50-68 C linear alkane per 100 pts. wt. of primary alcohol [pts. wt.] |  | 0 | 0 | 0 | 0 | 0 | 0 | 0 |
| Rubber composition | Appearance evaluation | White discoloration at 40° C., L*(SCE) | A | B | B | A+ | B | A+ | A |
|  |  | White discoloration at 30° C., L*(SCE) | B | A+ | B | B | C | C | A |
|  | Ozone resistance evaluation | Conforming to JIS K 6301 | good | good | bad | bad | good | good | bad |

TABLE 4

|  |  |  | Compar. Ex. 6 | Compar. Ex. 7 | Compar. Ex. 8 | Compar. Ex. 9 | Compar. Ex. 10 | Compar. Ex. 11 |
|---|---|---|---|---|---|---|---|---|
| Surface modifier | Anti-aging wax for rubber (B) | Sample name |  |  | OZOACE-0355 |  |  |  |
|  |  | Amount [phr] | 2.0 | 2.0 | 2.0 | 2.0 | 2.0 | 2.0 |
|  | Appearance-improving agent (C) | Sample name | Acculinol700 | | Acculinol550 | | Acculinol425 | |
|  |  | Amount [phr] | 0.115 | 0.573 | 0.113 | 0.563 | 0.113 | 0.565 |
|  | Auxiliary modifier (D) | Amount [phr] | 0 | 0 | 0 | 0 | 0 | 0 |

TABLE 4-continued

|  |  |  | Compar. Ex. 6 | Compar. Ex. 7 | Compar. Ex. 8 | Compar. Ex. 9 | Compar. Ex. 10 | Compar. Ex. 11 |
|---|---|---|---|---|---|---|---|---|
|  | Content of primary alcohol per 100 pts. wt. of surface modifier [pts. wt.] |  | 4.7 | 19.4 | 4.7 | 19.5 | 4.7 | 19.5 |
|  | Contents of components with different carbon numbers per 100 pts. wt. of primary alcohol [pts. wt.] | 30-38 C | | 17.4 | | 27.0 | | 37.4 |
|  |  | 12-26 C | | 2.3 | | 8.5 | | 39.2 |
|  |  | 42-68 C | | 73.0 | | 43.4 | | 9.6 |
|  |  | Melting peak temperature [° C.] | | 98.6 | | 88.5 | | 75.3 |
|  | Amount of primary alcohol per 100 pts. wt. of rubber component (A) [pts. wt.] |  | 0.1 | 0.5 | 0.1 | 0.5 | 0.1 | 0.5 |
|  | Amounts of components with different carbon numbers of primary alcohol per 100 pts. wt. of rubber component (A) [pts. wt.] | 30-38 C | 0.0174 | 0.087 | 0.02697 | 0.13485 | 0.0374 | 0.187 |
|  |  | 12-26 C | 0.00225 | 0.01125 | 0.00851 | 0.04255 | 0.0392 | 0.196 |
|  |  | 42-68 C | 0.072997 | 0.364985 | 0.04336 | 0.2168 | 0.0096 | 0.048 |
|  | Content of 50-68 C linear alkane per 100 pts. wt. of primary alcohol [pts. wt.] |  | | 5.06 | | 2.41 | | 1.22 |
| Rubber composition | Appearance evaluation | White discoloration at 40° C., L*(SCE) | A | C | B | B | A | B |
|  |  | White discoloration at 30° C., L*(SCE) | A | C | B | B | A+ | B |
|  | Ozone resistance evaluation | Conforming to JIS K 6301 | bad | bad | bad | bad | bad | bad |

TABLE 5

|  |  |  | Conv. Ex. 3 | Example 8 |
|---|---|---|---|---|
| Surface modifier | Anti-aging wax for rubber (B) | Sample name | OZOACE-0015A | OZOACE-0015A |
|  |  | Amount [phr] | 2.0 | 2.0 |
|  | Appearance-improving agent (C) | Sample name | — | SS-II Hydrolyzate |
|  |  | Amount [phr] | 0 | 0.45 |
|  | Auxiliary modifier (D) | Amount [phr] | 0 | 0 |
|  | Content of primary alcohol per 100 pts. wt. of surface modifier [pts. wt.] |  | — | 9.6 |
|  | Contents of components with different carbon numbers per 100 pts. wt. of primary alcohol [pts. wt.] | 30-38 C | — | 72.8 |
|  |  | 12-26 C | — | 12.4 |
|  |  | 42-68 C | — | 0.0 |
|  |  | Melting peak temperature [° C.] | — | 81.2 |
|  | Amount of primary alcohol per 100 pts. wt. of rubber component (A) [pts. wt.] |  | — | 0.2 |
|  | Amounts of components with different carbon numbers of primary alcohol per 100 pts. wt. of rubber component (A) [pts. wt.] | 30-38 C | 0 | 0.1456 |
|  |  | 12-26 C | 0 | 0.0248 |
|  |  | 42-68 C | 0 | 0 |
|  | Content of 50-68 C linear alkane per 100 pts. wt. of primary alcohol [pts. wt.] |  | — | 0 |
| Rubber composition | Appearance evaluation | White discoloration at 40° C., L*(SCE) | reference | S |
|  |  | White discoloration at 30° C., L*(SCE) | reference | A |
|  | Ozone resistance evaluation | Conforming to JIS K 6301 | reference | good |

TABLE 6

|  |  |  | Conv. Ex. 4 | Example 9 | Example 10 | Compar. Ex. 12 | Compar. Ex. 13 | Compar. Ex. 14 | Compar. Ex. 15 |
|---|---|---|---|---|---|---|---|---|---|
| Surface modifier | Anti-aging wax for rubber (B) | Sample name | OZOACE-0355 | OZOACE-0355 | OZOACE-0355 | OZOACE-0355 | OZOACE-0355 | OZOACE-0355 | OZOACE-0355 |
|  |  | Amount [phr] | 2.0 | 2.0 | 2.0 | 2.0 | 2.0 | 2.0 | 2.0 |
|  | Appearance-improving agent (C) | Sample name | — | SS-II Hydrolyzate | SS-II Hydrolyzate | Unilin700 Distillate | Acculinol700 | Acculinol350 | ECOSOLE-0001 Hydrolyzate |
|  |  | Amount [phr] | 0 | 0.42 | 0.42 | 0.2 | 0.229 | 0.224 | 0.41 |
|  | Auxiliary modifier (D) | Amount [phr] | 0 | 0 | 0.2 | 0 | 0 | 0 | 0 |
|  | Content of primary alcohol per 100 pts. wt. of surface modifier [pts. wt.] |  | — | 8.3 | 7.6 | 9.1 | 9.0 | 9.0 | 8.3 |

TABLE 6-continued

|  |  |  | Conv. Ex. 4 | Example 9 | Example 10 | Compar. Ex. 12 | Compar. Ex. 13 | Compar. Ex. 14 | Compar. Ex. 15 |
|---|---|---|---|---|---|---|---|---|---|
|  | Contents of components with different carbon numbers per 100 pts. wt. of primary alcohol [pts. wt.] | 30-38 C | — | 72.8 | 51.4 | 17.4 | 22.8 | 17.3 |  |
|  |  | 12-26 C | — | 12.4 | 0.8 | 2.3 | 61.2 | 65.6 |  |
|  |  | 42-68 C | — | 0.0 | 30.4 | 73.0 | 2.4 | 0.0 |  |
|  |  | Melting peak temperature [° C.] | — | 81.2 | 90.9 | 98.6 | 65.1 | — |  |
|  |  | Amount [phr] | 0 | 0.42 | 0.42 | 0.2 | 0.229 | 0.224 | 0.41 |
|  |  | Amount in terms of alcohol [phr] | 0 | 0.2 | 0.2 | 0.2 | 0.2 | 0.2 | 0.2 |
|  | Amount of primary alcohol per 100 pts. wt. of rubber component (A) [pts. wt.] |  | — | 0.2 | 0.2 | 0.2 | 0.2 | 0.2 | 0.2 |
|  | Amounts of components with different carbon numbers of primary alcohol per 100 pts. wt. of rubber component (A) [pts. wt.] | 30-38 C | 0 | 0.1456 | 0.1456 | 0.1028 | 0.0348 | 0.04564 | 0.0346 |
|  |  | 12-26 C | 0 | 0.0248 | 0.0248 | 0.0016 | 0.0046 | 0.12234 | 0.1312 |
|  |  | 42-68 C | 0 | 0 | 0 | 0.0608 | 0.146 | 0.00474 | 0 |
|  | Content of 50-68 C linear alkane per 100 pts. wt. of primary alcohol [pts. wt.] |  | — | 0 | 0 | 0 | 5.06 | 0.79 | 0 |
| Rubber composition | Appearance evaluation | White discoloration at 40° C., L*(SCE) | reference | S | S | S | S | B | B |
|  |  | White discoloration at 30° C., L*(SCE) | reference | A+ | S | B | B | B | C |
|  | Ozone resistance evaluation | Conforming to JIS K 6301 | reference | good | good | good | bad | good | good |

TABLE 7

|  |  |  | Conv. Ex. 1 | Conv. Ex. 2 | Example 1 | Example 2 | Example 4 | Example 5 | Example 6 |
|---|---|---|---|---|---|---|---|---|---|
| Surface modifier | Anti-aging wax for rubber (B) | Sample name | OZOACE-0355 | | | | OZOACE-0355 | | |
|  |  | Amount [phr] | 2.0 | 2.0 | 2.0 | 2.0 | 2.0 | 2.0 | 2.0 |
|  | Appearance-improving agent (C) | Sample name | — | Hi-Mic-1080 | SS-II Hydrolyzate | SS-II Hydrolyzate | Unilin425 | Unilin425 Distillate-2 | Unilin425 Distillate-3 |
|  |  | Amount [phr] | 0 | 0.1 | 0.21 | 1.03 | 0.1 | 0.5 | 0.1 |
|  | Auxiliary modifier (D) | Amount [phr] | 0 | 0 | 0 | 0 | 0 | 0 | 0 |
| Rubber composition | Appearance evaluation (outdoor exposure test) | White discoloration, L*(SCE) | reference | B | S | S | S | S | S |
|  |  | Brown discoloration, a* + b*(SCE) | reference | B | A+ | S | A | S | S |
|  |  | Visual observation of brown discoloration | bad | fair | good | good | good | good | good |

TABLE 8

|  |  |  | Conv. Ex. 3 | Example 8 |
|---|---|---|---|---|
| Surface modifier | Anti-aging wax for rubber (B) | Sample name | OZOACE-0015A | |
|  |  | Amount [phr] | 2.0 | 2.0 |
|  | Appearance-improving agent (C) | Sample name | — | SS-II Hydrolyzate |
|  |  | Amount [phr] | 0 | 0.21 |
|  | Auxiliary modifier (D) | Amount [phr] | 0 | 0 |
| Rubber composition | Appearance evaluation (outdoor exposure test) | White discoloration, L*(SCE) | reference | S |
|  |  | Brown discoloration, a* + b*(SCE) | reference | A+ |
|  |  | Visual observation of brown discoloration | bad | good |

TABLE 9

|  |  |  | Conv. Ex. 4 | Example 9 | Example 10 | Compar. Ex. 12 | Compar. Ex. 13 | Compar. Ex. 14 | Compar. Ex. 15 |
|---|---|---|---|---|---|---|---|---|---|
| Surface modifier | Anti-aging wax for rubber (B) | Sample name | | | | OZOACE-0355 | | | |
| | | Amount [phr] | 2.0 | 2.0 | 2.0 | 2.0 | 2.0 | 2.0 | 2.0 |
| | Appearance-improving agent (C) | Sample name | — | SS-II Hydrolyzate | SS-II Hydrolyzate | Unilin700 Distillate | Acculinol700 | Acculinol350 | ECOSOLE-0001 Hydrolyzate |
| | | Amount [phr] | 0 | 0.42 | 0.42 | 0.2 | 0.229 | 0.224 | 0.41 |
| | Auxiliary modifier (D) | Amount [phr] | 0 | 0 | 0.2 | 0 | 0 | 0 | 0 |
| Rubber composition | Appearance evaluation (outdoor exposure test) | White discoloration, L*(SCE) | reference | S | A | B | S | B | C |
| | | Brown discoloration, a* + b*(SCE) | reference | A | A | B | B | B | B |
| | | Visual observation of brown discoloration | fair | good | good | fair | fair | bad | bad |

From the results of Tables 2 to 5, the followings are understood for a case where mixed rubber (NR/BR) was used as the rubber component (A).

In Comparative Examples 1 and 2, the result of the white discoloration test was not particularly problematic; however, ozone resistance decreased. The reason for this is considered that the content of the component having 30 to 38 carbon atoms per 100 parts by weight of the primary alcohol is less than the preferred range, and the content of the component having 12 to 26 carbon atoms is more than the preferred range.

In Comparative Examples 3 and 4, the result of the ozone resistance test was good; however, the result of the white discoloration test at 30° C. was very bad. The reason for this is considered that the content of the component having 42 to 68 carbon atoms per 100 parts by weight of the primary alcohol is more than the preferred range. Note that, in Conventional Example 2, the result of the ozone resistance test was good; however, the result of the white discoloration test at 30° C. was also very bad.

In Comparative Example 5, the contents of the components with different carbon numbers per 100 parts by weight of the primary alcohol contained in the surface modifier were within the preferred range and the result of the white discoloration test was not particularly problematic. However, in the rubber composition, the content of the component having 12 to 26 carbon atoms of the primary alcohol per 100 parts by weight of the rubber component (A) was more than 0.1 parts by weight, and the result of the ozone resistance test was very bad.

Comparative Examples 6 to 11 are all examples in which commercially available synthesized higher alcohols were used, and ozone resistance decreased for all of these Comparative Examples.

In Comparative Example 6, although the content of the component having 30 to 38 carbon atoms per 100 parts by weight of the primary alcohol was less than the preferred range and the content of the component having 42 to 68 carbon atoms was more than the preferred range, an appearance-improving effect was obtained. The reason for this is understood that the content of a normal alkane having 50 or more carbon atoms, which have an appearance-improving effect, is relatively large. Meanwhile, in Comparative Example 7, the content of the component having 42 to 68 carbon atoms is more than the preferred range, and the added amount of the primary alcohol per 100 parts by weight of the rubber component (A) is 0.5 parts by weight. Therefore, it is considered that the added amount of the component having 42 to 68 carbon atoms in the rubber composition became large, and appearance of the rubber composition was significantly deteriorated. Furthermore, it is considered that the content of the component having 30 to 38 carbon atoms is less than the preferred range, and therefore the appearance-improving effect on the rubber composition was not sufficiently obtained. It is understood that, in Comparative Examples 8 and 9, the content of the component having 30 to 38 carbon atoms was less than the preferred range and the content of the component having 42 to 68 carbon atoms was more than the preferred range, and therefore the appearance-improving effect was not obtained. In Comparative Examples 6 to 9, although the content of the component having 12 to 26 carbon atoms was within the preferred range, the result of the ozone resistance test was bad. The reason for this is considered that the content of the normal alkane having 50 or more carbon atoms was large.

It is understood that, in Comparative Examples 10 and 11, the content of the component having 30 to 38 carbon atoms per 100 parts by weight of the primary alcohol was within the preferred range, and therefore a certain level of appearance-improving effect on the rubber composition was obtained in a case where the added amount of the primary alcohol per 100 parts by weight of the rubber component (A) was 0.1 parts by weight as in Comparative Example 10. Meanwhile, it is considered that, as in Comparative Example 11, when the added amount of the primary alcohol per 100 parts by weight of the rubber component (A) was 0.5 parts by weight, the added amount of the component having 42 to 68 carbon atoms in the rubber composition was large, and therefore the appearance-improving effect on the rubber composition decreased. It is considered that, in Comparative Examples 10 and 11, the content of the component having 12 to 26 carbon atoms was more than the preferred range, and therefore ozone resistance decreased.

As described above, in a case where commercially available synthesized higher alcohols were used, ozone resistance decreased in all cases, and the appearance-improving effect was not sufficiently obtained in some cases.

On the contrary, in Examples 1 to 6, the result of the white discoloration test was good under temperature conditions of both 40° C. and 30° C., and, in addition, ozone resistance was also excellent. Furthermore, in Example 7 in which the auxiliary modifier was added, excellent results were also obtained for both white discoloration test and ozone resistance test. Thus, it was confirmed that containing the surface modifier of the present invention allowed enhancement of appearance of the rubber composition without decreasing ozone resistance.

Furthermore, as shown in Example 8, it was confirmed that, even in a case of using, as the anti-aging wax for rubber (B) contained in the surface modifier, an anti-aging wax for rubber which was different from those used in Examples 1 to 7, appearance could be enhanced without decreasing ozone resistance of the rubber composition.

Furthermore, from the results of Tables 7 and 8, it was confirmed that, in Examples 1, 2, 4 to 6, and 8, white discoloration and brown discoloration were suppressed in the outdoor exposure test, and therefore these Examples were more excellent than Conventional Examples 1, 2 and 3.

Next, from the results of Tables 6 and 9, the followings are understood for a case where styrene-butadiene rubber (SBR) was used as the rubber component (A).

In Comparative Example 12, the results of the white discoloration test and ozone resistance test were not particularly problematic. However, appearance was brownish in the brown discoloration evaluation by visual observation in the outdoor exposure test, and this is not practically preferred. The reason for this is considered that the content of the component having 42 to 68 carbon atoms per 100 parts by weight of the primary alcohol is more than the preferred range.

Comparative Examples 13 and 14 are examples in which commercially available synthesized higher alcohols were used.

In Comparative Example 13, the result of the white discoloration test was not particularly problematic. However, appearance was brownish in brown discoloration evaluation by visual observation in the outdoor exposure test. The reason for this is considered that the content of the component having 30 to 38 carbon atoms per 100 parts by weight of the primary alcohol is less than the preferred range, and the content of the component having 42 to 68 carbon atoms is more than the preferred range. Note that, ozone resistance decreased and evaluation results of white discoloration in the white discoloration test at 40° C. and outdoor exposure test were good. The reason for this is understood that the content of the normal alkane having 50 or more carbon atoms is large.

In Comparative Example 14, the results of the white discoloration test and ozone resistance test were not particularly problematic. However, clear brown discoloration in appearance was observed in brown discoloration evaluation by visual observation in the outdoor exposure test. The reason for this is considered that the content of the component having 30 to 38 carbon atoms per 100 parts by weight of the primary alcohol is less than the preferred range, and the content of the component having 12 to 26 carbon atoms is more than the preferred range.

In Comparative Example 15, the result of the ozone resistance test was good. However, the result of the white discoloration test at 30° C. was very bad. In addition, evaluation results of the white discoloration and brown discoloration in visual observation in the outdoor exposure test were very bad. The reason for this is considered that the content of the component having 30 to 38 carbon atoms per 100 parts by weight of the primary alcohol is less than the preferred range, and the content of the component having 12 to 26 carbon atoms is more than the preferred range.

On the contrary, in Examples 9 and 10, the result of the white discoloration test was very good under temperature conditions of both 40° C. and 30° C., and, in addition, ozone resistance was also excellent. Furthermore, it was confirmed that white discoloration and brown discoloration were suppressed in the outdoor exposure test, and therefore these Examples were more excellent than Conventional Example 4 and Comparative Examples 12 to 15.

It should be noted that, in the present Examples, examples were shown in which mixed rubber (NR/BR) obtained by blending natural rubber and butadiene rubber at a ratio of 1:1 in terms of parts by weight, and styrene-butadiene rubber (SBR) were used as a rubber component (A). However, similar results are also expected to be obtained in a case where mixed rubber blended at a different blending ratio or another type of rubber is used.

Although the embodiments of the present invention have been described above, specific embodiments are not limited to these embodiments. Any change in design without departing from the gist of the present invention should be included in the scope of the present invention.

The invention claimed is:

1. A surface modifier for a rubber composition comprising a hydrocarbon-based anti-aging wax for rubber (B), and an appearance-improving agent (C), and
further comprising a hydrolyzate of plant wax, or a distillate of a synthesized higher alcohol obtained by molecular distillation,
wherein a content of a linear monovalent primary alcohol is more than 1.5 parts by weight and less than 35 parts by weight per 100 parts by weight of the surface modifier for a rubber composition, and
wherein, per 100 parts by weight of the primary alcohol,
a content of a component having 30 to 38 carbon atoms is more than 35 parts by weight,
a content of a component having 12 to 26 carbon atoms is less than 25 parts by weight, and
a content of a component having 42 to 68 carbon atoms is less than 25 parts by weight.

2. The surface modifier for a rubber composition according to claim 1, wherein the content of the primary alcohol is more than 2 parts by weight and less than 25 parts by weight per 100 parts by weight of the surface modifier for a rubber composition.

3. The surface modifier for a rubber composition according to claim 1, wherein, per 100 parts by weight of the primary alcohol,
the content of the component having 30 to 38 carbon atoms is more than 70 parts by weight,
the content of the component having 12 to 26 carbon atoms is less than 15 parts by weight, and
the content of the component having 42 to 68 carbon atoms is less than 5 parts by weight.

4. The surface modifier for a rubber composition according to claim 1, wherein the plant wax is rice bran wax.

* * * * *